(12) United States Patent
Sprowl et al.

(10) Patent No.: US 8,269,670 B2
(45) Date of Patent: Sep. 18, 2012

(54) REUSABLE, HERMETIC, MEDICAL GRADE RFID TAG

(75) Inventors: Clyde W. Sprowl, Huntington, IN (US); Matthew R. LaFontaine, Fort Wayne, IN (US); Michael D. Westrick, Huntertown, IN (US); Daniel L. Sands, Warsaw, IN (US)

(73) Assignee: Solstice Medical, LLC, Fort Wayne, IN (US)

( * ) Notice: Subject to any disclaimer, the term of this patent is extended or adjusted under 35 U.S.C. 154(b) by 701 days.

(21) Appl. No.: 12/247,580

(22) Filed: Oct. 8, 2008

(65) Prior Publication Data

US 2009/0096629 A1  Apr. 16, 2009

Related U.S. Application Data

(60) Provisional application No. 61/014,189, filed on Dec. 17, 2007, provisional application No. 60/979,625, filed on Oct. 12, 2007.

(51) Int. Cl.
*H01Q 1/38* (2006.01)
*G08B 13/14* (2006.01)

(52) U.S. Cl. .............. 343/700 MS; 343/872; 340/572.7; 340/572.8

(58) Field of Classification Search ........... 343/700 MS, 343/872; 340/572.1, 572.7, 572.8
See application file for complete search history.

(56) References Cited

U.S. PATENT DOCUMENTS

| 7,911,404 | B2 | 3/2011 | Yamagajo et al. | |
|---|---|---|---|---|
| 2004/0074974 | A1* | 4/2004 | Senba et al. | 235/492 |
| 2006/0054710 | A1* | 3/2006 | Forster et al. | 235/492 |
| 2006/0208901 | A1* | 9/2006 | Kai et al. | 340/572.7 |
| 2007/0139202 | A1 | 6/2007 | Austin | |
| 2007/0262868 | A1 | 11/2007 | Westrick et al. | |
| 2008/0122631 | A1* | 5/2008 | Kodukula et al. | 340/572.8 |
| 2008/0150726 | A1 | 6/2008 | Yamagajo et al. | |

FOREIGN PATENT DOCUMENTS

| EP | 1 630 730 A1 | 3/2006 |
|---|---|---|
| KR | 10 2006 0103628 A | 10/2006 |
| WO | 2007/029296 A1 | 3/2007 |

OTHER PUBLICATIONS

International Search Report dated Feb. 27, 2009 for PCT/US2008/079289 (2 pages).
International Preliminary Report on Patentability dated Apr. 13, 2010 for PCT/US2008/079289 (4 pages).
Written Opinion of International Searching Authority dated Feb. 27, 2009 for PCT/US2008/079289 (3 pages).
Communication dated Mar. 3, 2011 from European Patent Office for European Patent Application No. EP 08836857.6-2210 (6 pages).

* cited by examiner

*Primary Examiner* — Dieu H Duong
(74) *Attorney, Agent, or Firm* — Taylor IP, P.C.

(57) ABSTRACT

An RFID tag includes a circuit board assembly having a circuit board, an RFID circuit, an antenna, and a metallic ground plane. The circuit board has a first side and a second side. The circuit board carries the antenna on the first side and the ground plane on the second side. The RFID circuit is coupled with each of the antenna and the ground plane. A backplane is coupled with the ground plane, on a side of the ground plane opposite the circuit board. An overmolded housing surrounds and hermetically seals the circuit board assembly. The housing is comprised of a material which is both autoclavable and has a low dielectric constant of between approximately 1 to 5.

24 Claims, 3 Drawing Sheets

REUSABLE, HERMETIC, MEDICAL GRADE RFID TAG

CROSS REFERENCE TO RELATED APPLICATIONS

This is a non-provisional application based upon U.S. provisional patent application Ser. Nos. 61/014,189, entitled "REUSABLE, HERMETIC, MEDICAL GRADE RFID TAG", filed Dec. 17, 2007; and 60/979,625, entitled "REUSABLE, HERMETIC, MEDICAL GRADE RFID", filed Oct. 12, 2007, each of which are incorporated herein by reference.

BACKGROUND OF THE INVENTION

1. Field of the Invention

The present invention relates to RFID tags, and, more particularly, to RFID tags used for identification, inventory and tracking applications.

2. Description of the Related Art

Radio frequency identification (RFID) tags are well known throughout industry, and are being increasingly utilized for supply chain management, inventory management, and logistic control. These tags can be written to and read from a handheld transceiver or fixed portal. Small glass encapsulated low frequency tags are currently being utilized on surgical tools, storage cases and implantable devices. These small "capsules" contain their own "onboard" antenna, which suffer extreme radio frequency degradation and detuning due to interference created by the proximity of the metals utilized in surgical tools, storage cases and implantable devices. As a result of this proximity, virtual contact (actual physical contact or very short distances) must be maintained between the reader antenna and the RFID tag. This "virtual" contact requirement makes communication with a surgically implanted device impossible, and reliable communication with a storage case or set of surgical tools impractical.

SUMMARY OF THE INVENTION

The present invention provides an RFID tag which may be used for medical applications, is hermetically sealed, and sterilizable.

The invention in one form is directed to an RFID tag, including a circuit board assembly having a circuit board, an RFID circuit, an antenna, and a metallic ground plane. The circuit board has a first side and a second side. The circuit board carries the antenna on the first side and the ground plane on the second side. The RFID circuit is coupled with each of the antenna and the ground plane. An overmolded housing surrounds and hermetically seals the circuit board assembly. The housing is comprised of a material which is both autoclavable and has a low dielectric constant of between approximately 1 to 5.

The invention in another form is directed to an RFID tag, including a circuit board assembly having a circuit board, an RFID circuit, an antenna, and a metallic ground plane. The circuit board has a first side and a second side. The circuit board carries the antenna on the first side and the ground plane on the second side. The RFID circuit is coupled with each of the antenna and the ground plane. A backplane is coupled with the ground plane, on a side of the ground plane opposite the circuit board. An overmolded housing surrounds and hermetically seals the circuit board assembly. The housing is comprised of a material which is both autoclavable and has a low dielectric constant of between approximately 1 to 5.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiments of the invention, in one form, and such exemplification is not to be construed as limiting the scope of the invention in any manner.

DETAILED DESCRIPTION OF THE INVENTION

Figure 1:
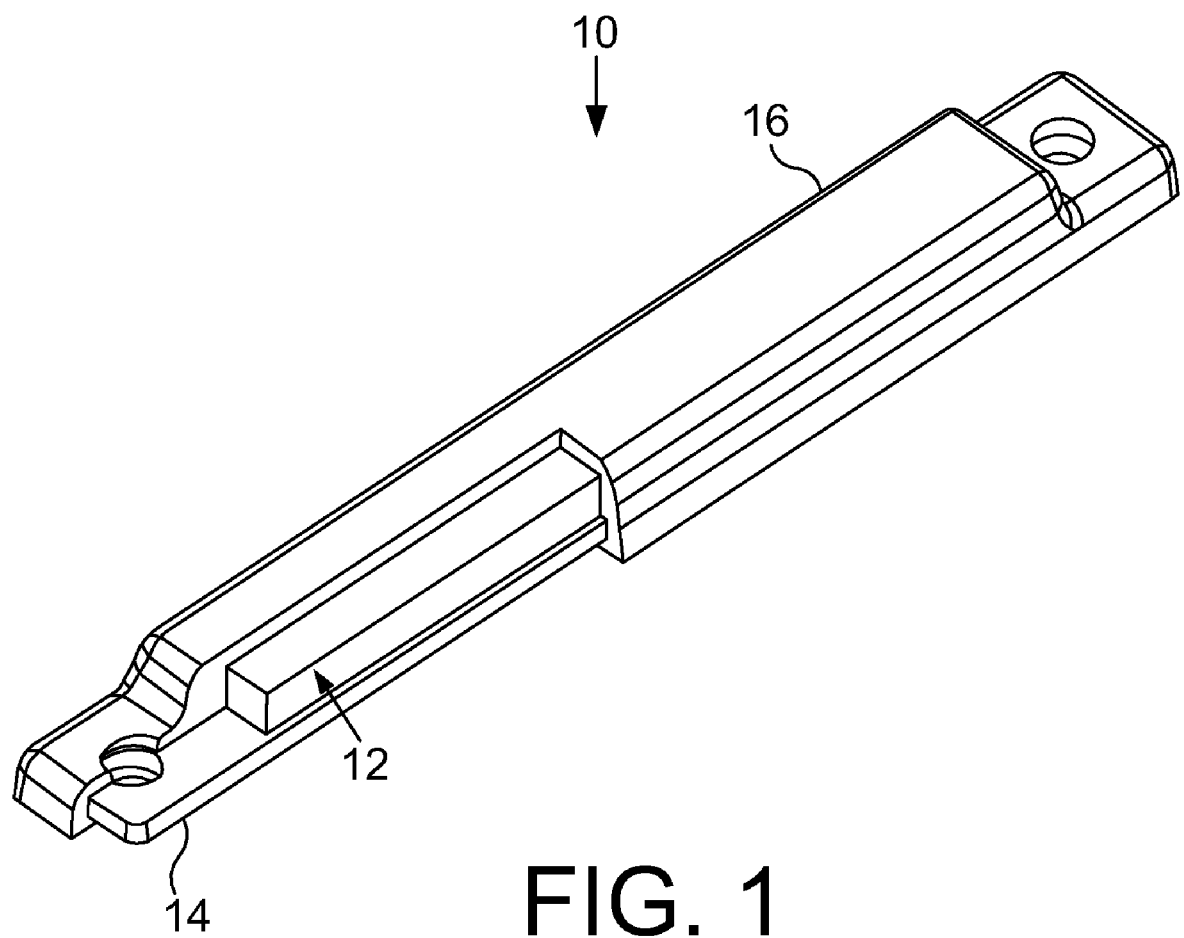
FIG. 1 is a perspective, partially sectioned view of an embodiment of a reusable, hermetic, medical grade RFID tag of the present invention.
Figure 2:
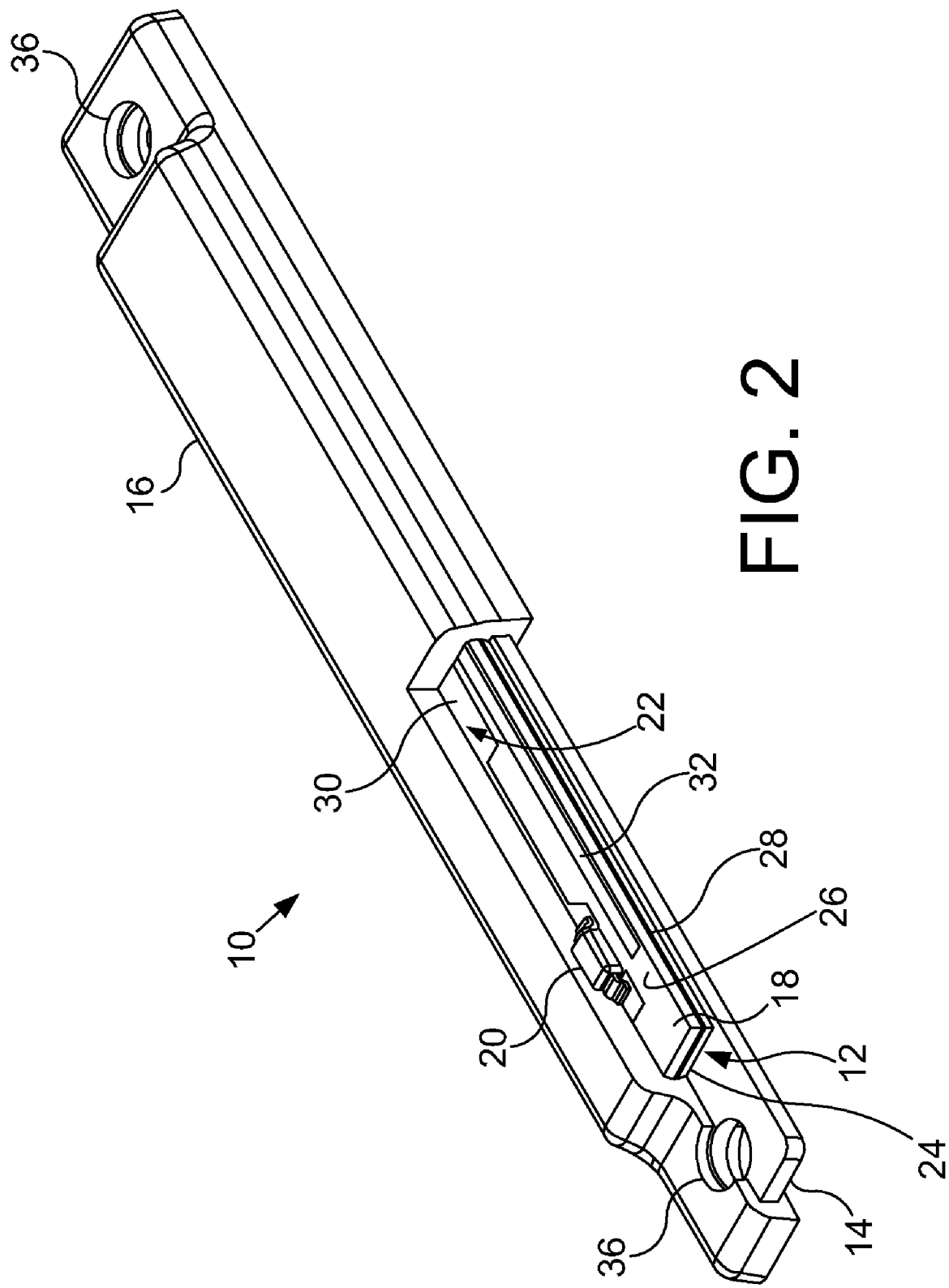
FIG. 2 is another perspective, partially sectioned view of the medical grade RFID tag shown in FIG. 1, similar to the view shown in FIG. 1.
Figure 3:
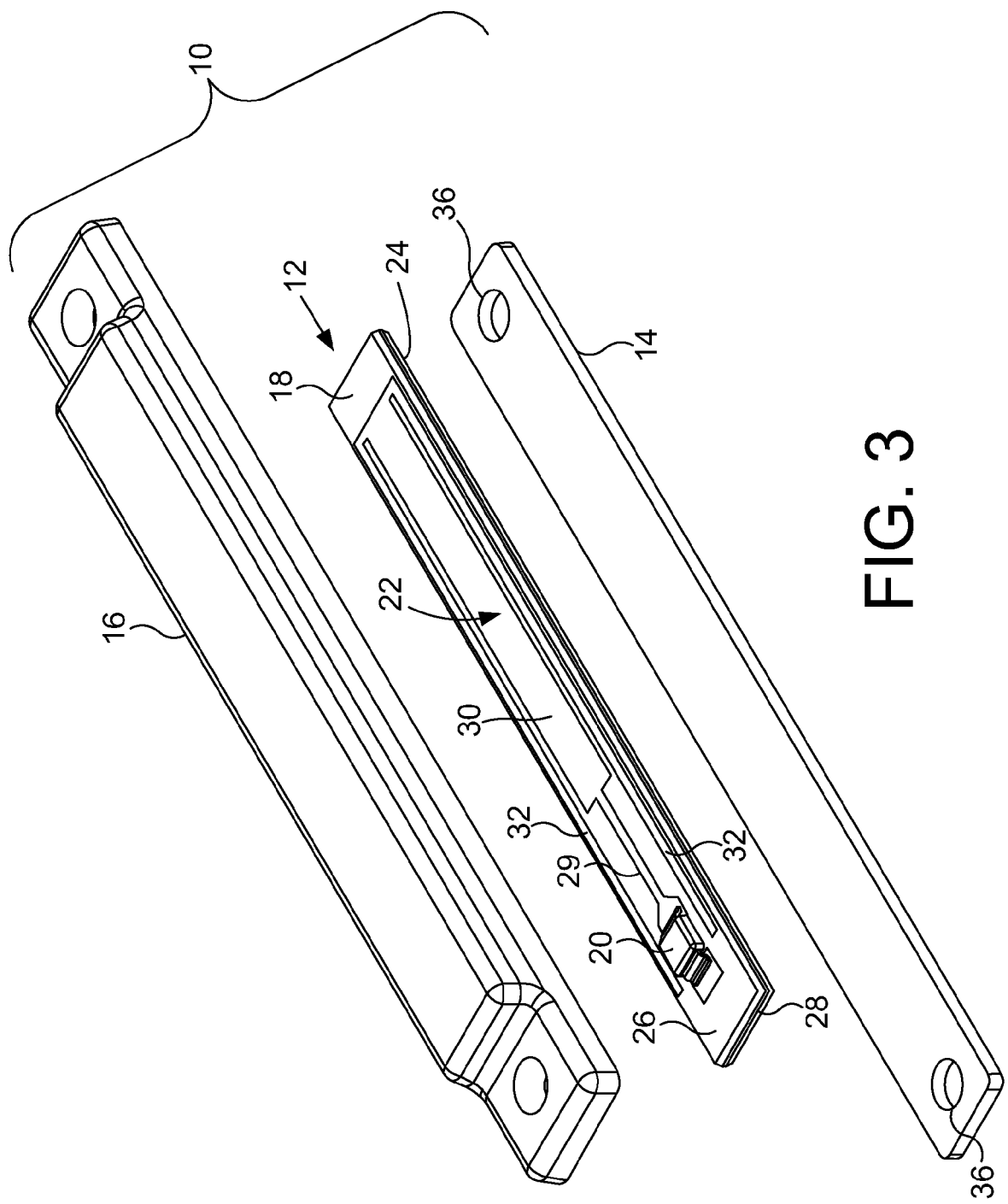
FIG. 3 is an exploded, perspective view of the medical grade RFID tag shown in FIGS. 1 and 2.

Referring now to the drawings, there is shown an embodiment of an RFID tag (transponder) 10 of the present invention, which generally includes a circuit board assembly 12, backplane 14 and overmolded housing 16.

Circuit board assembly 12 includes a circuit board 18, an RFID circuit 20, an antenna 22, and a metallic ground plane 24. Circuit board 18 has a first side 26 and a second side 28. Circuit board 18 carries RFID circuit 20 and antenna 22 on first side 26. Circuit board 18 also carries ground plane 24 on second side 28.

Circuit board 18 may be constructed from a material with a high dielectric constant of greater than approximately 4 and less than approximately 80. In the illustrated embodiment, circuit board 18 is a printed circuit board which is preferably made from Arlon™, having a high dielectric constant with low loss tangent.

RFID circuit 20 is preferably constructed as an integrated circuit (IC) which is surface mounted to circuit board 18. RFID circuit 20 could also be mounted to circuit board 18 using leaded or other suitable connections. It is also possible that RFID circuit 20 could be further reduced in size, such as by being configured as an application specific IC (ASIC). It will thus be appreciated that the particular configuration of RFID circuit 20 can vary, depending on the application.

RFID circuit 20 includes a plurality of components with similar coefficients of thermal expansion so as not to fail from thermal expansion and contraction during repeated autoclave cycles. For example, besides including an IC as described above, RFID circuit 20 may include other integral electronic components with SMT or leaded connections which are formed so as to withstand multiple autoclaving cycles, e.g., greater than 500 cycles, preferably greater than 1000 cycles.

Antenna 22 is mounted flat on circuit board 18 and coupled with IC 20 via a trace or other suitable connection. Antenna 22 is a patch type antenna, preferably with a folded configuration to again reduce size while maintaining adequate surface area. To that end, antenna 22 includes an impedance matching stub 29, a central portion 30 extending from IC 20 toward one end of circuit board 18, and a pair of folded back arms 32 extending much of the length of circuit board 18 in an opposite direction.

Ground plane 24 is made a part of circuit board assembly 12, and functions to couple circuit board assembly 12 with backplane 14. In theory it might be possible to not use ground plane 24 and instead only use backplane 14, but ground plane 24 offers a less expensive way of coupling circuit board assembly 12 with backplane 14, through the use of vias in circuit board 18 coupled with ground plane 24. In the embodiment shown, ground plane 24 is a copper ground plane which is coupled with RFID circuit 20 and provides a reference ground. Ground plane 24 is a shield in the sense that radio frequency (RF) signals radiate in a direction away from ground plane 28, thus shielding the part to which RFID tag 10 is attached from the RF signals. Ground plane 24 has a large enough surface area that it effectively couples with backplane 14, and in the illustrated embodiment is approximately the same size as circuit board 18. It is possible to use an intervening adhesive between ground plane 24 and backplane 14 which does not affect the coupling therebetween.

Backplane 14 extends past ground plane 24 of circuit board assembly 12. In this manner, backplane 14 forms a larger effective ground plane and also self resonates when RFID tag 10 is attached to a non-metal object. The extent to which backplane 14 extends past ground plane 24 is sufficient to accomplish this self resonating function. Backplane 14 includes at least one mounting feature 36 in an area outside of ground plane 24. In the embodiment shown, backplane 14 includes a pair of mounting features in the form of mounting holes 36 in the area outside of ground plane 24. Backplane 14 is preferably made from stainless steel, but could be made from a different type of suitable metal.

Housing 16 is an overmolded housing which surrounds and hermetically seals circuit board assembly 12. Housing 16 is constructed from a material which is both autoclavable and has a low dielectric constant of between approximately 1 to 5. Housing 16 is constructed from an autoclavable material which can withstand multiple autoclave cycles at a temperature of greater than approximately 250° F., and can withstand greater than 500 autoclave cycles, preferably greater than 1000 autoclave cycles. Housing 16 may also be constructed from a biocompatible material if intended to be implanted within an animal body. For example, housing 16 may be constructed from a medical grade, sterilizable material, such as a medical grade silicone.

In summary, the present invention is directed to an RFID transponder 10 which is able to be reused, presents a hermetic barrier to contamination from biological agents, is capable of surviving repeated autoclave and sanitizing cycles, and can be read by appropriate RFID readers at a range of 3 to 5 feet.

RFID transponder 10 is constructed by providing an electronic circuit, bonded to a metallic substrate, and the pair totally encapsulated within a silicone overmold. IC 20 is surface mounted to printed circuit board 18, which in turn is adhered on the back side with a copper shield or ground plane 24. Ground plane 24 is mounted to backplane 14, which is preferably made of stainless steel. The silicone overmolded housing 16 is preferably a medical grade silicone.

Current embodiments of RFID transponders are not suitable for use in medical environments for the following reasons:

1. Current transponders are not hermetic, and unable to survive multiple sterilization processes common to hospitals and health care facilities.
2. Current transponders are not fabricated of medical grade materials, which makes them unsuitable for use in hospitals and health care facilities.
3. Current RFID transponders are of a size which makes mounting to medical surgery cases and appliances difficult.
4. Current RFID transponders are not designed to possess the ability to be fastened to either plastic or metal substrates and still be readable at the desired range.

The RFID transponder 10 of the present invention has the following non-inclusive advantages:

a. Sterilizable (e.g., autoclavable, submersible and high heat tolerance).
b. Rugged.
c. Biocompatible.
d. Readability of 3 to 15 feet.
e. Easily attached to plastic and metallic surgery cases and appliances.
f. Inherent ability to be read equally well when attached to plastic or metallic substrates.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A radio frequency identification (RFID) tag, comprising:
   a circuit board assembly including a circuit board, an RFID circuit, an antenna, and a metallic ground plane, said circuit board having a first side and a second side, said circuit board carrying said antenna on said first side and said ground plane on said second side, said RFID circuit being coupled with each of said antenna and said ground plane;
   a backplane coupled with said ground plane along said second side; and
   an overmolded housing surrounding and hermetically sealing said circuit board assembly and said backplane, said housing being comprised of a material which is both autoclavable and has a low dielectric constant of between approximately 1 to 5, said backplane extending past said ground plane a predetermined amount within said overmolded housing, said predetermined amount sufficient for self resonation, the RFID tag being configured to be attached to metallic and non-metallic objects with said self resonation occurring regardless as to whether the RFID tag is attached to the metallic or the non-metallic object.

2. The RFID tag of claim 1, wherein said predetermined amount that said backplane extends past said circuit board assembly is sufficient for at least one mounting hole to extend through said backplane and said housing together in an area outside of said ground plane.

3. The RFID tag of claim 2, wherein said backplane is comprised of stainless steel.

4. The RFID tag of claim 1, wherein said circuit board is comprised of a material with a high dielectric constant of greater than approximately 4 and less than approximately 80, and said ground plane is mounted to said circuit board.

5. The RFID tag of claim 1, wherein said circuit board carries said RFID circuit on said first side.

6. The RFID tag of claim 1, wherein said RFID circuit includes an integrated circuit (IC) coupled with said antenna.

7. The RFID tag of claim 6, wherein said antenna is a folded antenna with an impedance matching stub coupled with said IC.

8. The RFID tag of claim 6, wherein said circuit board assembly includes a plurality of components with similar coefficients of thermal expansion so as not to fail from thermal expansion and contraction during repeated autoclave cycles.

9. The RFID tag of claim 1, wherein said ground plane is a copper ground plane.

10. The RFID tag of claim 9, wherein said copper ground plane acts as a shield.

11. The RFID tag of claim 10, wherein said autoclavable material can withstand greater than 500 autoclave cycles.

12. The RFID tag of claim 11, wherein said housing is formed from a medical grade silicone.

13. The RFID tag of claim 10, wherein said housing is formed from a medical grade material.

14. The RFID tag of claim 1, wherein said housing is comprised of an autoclavable material which can withstand multiple autoclave cycles at a temperature of greater than approximately 250° F.

15. A radio frequency identification (RFID) tag, comprising:
 a circuit board assembly including a circuit board, an RFID circuit, an antenna, and a metallic ground plane, said circuit board having a first side and a second side, said circuit board carrying said antenna on said first side and said ground plane on said second side, said RFID circuit being coupled with each of said antenna and said ground plane;
 a backplane coupled with said ground plane, on a side of said ground plane opposite said circuit board; and
 an overmolded housing surrounding and hermetically sealing said circuit board assembly and said backplane, said housing being comprised of a material which is both autoclavable and has a low dielectric constant of between approximately 1 to 5, said backplane extending past said ground plane a predetermined amount within said overmolded housing, said predetermined amount sufficient for self resonation, the RFID tag being configured to be attached to metallic and non-metallic objects with said self resonation occurring regardless as to whether the RFID tag is attached to the metallic or the non-metallic object.

16. The RFID tag of claim 15, wherein said predetermined amount that said backplane extends past said circuit board assembly is sufficient for at least one mounting hole to extend through said backplane and said housing together in an area outside of said ground plane.

17. The RFID tag of claim 15, wherein said circuit board is comprised of a material with a high dielectric constant of greater than approximately 4, and said ground plane is mounted to said circuit board.

18. The RFID tag of claim 15, wherein said circuit board carries said RFID circuit on said first side.

19. The RFID tag of claim 15, wherein said RFID circuit includes an integrated circuit (IC) coupled with said antenna.

20. The RFID tag of claim 19, wherein said circuit board assembly includes a plurality of components with similar coefficients of thermal expansion so as not to fail from thermal expansion and contraction during repeated autoclave cycles.

21. The RFID tag of claim 15, wherein said housing is comprised of an autoclavable material which can withstand multiple autoclave cycles at a temperature of greater than approximately 250° F.

22. The RFID tag of claim 21, wherein said autoclavable material can withstand greater than 500 autoclave cycles.

23. The RFID tag of claim 22, wherein said housing is formed from a medical grade material.

24. The RFID tag of claim 23, wherein said housing is formed from a medical grade silicone.

* * * * *